United States Patent [19]

Quarton et al.

[11] 4,032,760

[45] June 28, 1977

[54] PHOSPHOR PROTECTION FOR X-Y LOOPS

[75] Inventors: William T. Quarton; Peter R. Lowe, both of Englewood, Colo.

[73] Assignee: Honeywell Inc., Minneapolis, Minn.

[22] Filed: Oct. 22, 1975

[21] Appl. No.: 624,905

[52] U.S. Cl. ................................ 235/151; 235/198; 315/379; 340/146.2; 340/324 A

[51] Int. Cl.$^2$ ....................... G06G 7/28; G06F 3/14

[58] Field of Search .................. 235/151, 152, 198; 315/365, 367, 379, 384; 324/103 P; 340/324 A, 146.2

[56] References Cited

UNITED STATES PATENTS

| | | | |
|---|---|---|---|
| 3,509,542 | 4/1970 | Ehrman | 340/324 A X |
| 3,643,124 | 2/1972 | Aiani et al. | 315/367 |
| 3,665,410 | 5/1972 | Holland | 340/324 A X |
| 3,700,955 | 10/1972 | Lowe | 315/379 |
| 3,775,760 | 11/1973 | Strathman | 340/324 A |
| 3,878,984 | 4/1975 | Sotiropoulos et al. | 324/103 P X |
| 3,889,244 | 6/1975 | Sinobad | 315/365 X |
| 3,924,078 | 12/1975 | Bussey | 324/103 P X |

*Primary Examiner*—Jerry Smith
*Attorney, Agent, or Firm*—Laurence J. Marhoefer; Lockwood D. Burton

[57] ABSTRACT

An improved X-Y or vector type cathode ray tube circuit includes means to sense the imminence of and to inhibit excessive concentrations of electron beam current during the plotting of X-Y loops, which concentrations produce spots or points on the cathode ray tube screen that are essentially repetitive and convey no useful information to the observer, and if allowed to persist, tend to burn the phosphor coating of said screen.

11 Claims, 7 Drawing Figures

PHOSPHOR PROTECTION FOR X-Y LOOPS

BACKGROUND OF THE INVENTION

1. Field of the Invention

This invention relates to apparatus for producing displays of data signals, for example, analog physiological signals, and relates specifically to so-called X-Y or vector cathode ray tube (CRT) display apparatus.

2. Description of the Prior Art

Display apparatus utilizing cathode ray tubes for providing single or multi-channel displays and/or records of analog or digital information are known in the prior art. The cathode ray tube embodied in such apparatus includes a transparent display face or screen on the inside of which is a phosphor coating. The electron beam is impinged on and is swept horizontally and vertically across the phosphor coating. This produces a moving spot of light which is visible from the front of the face of the tube. In one form of such apparatus curves representative of the information under measurement, study and/or analysis are plotted as continuous lines or traces. In other forms of such apparatus, such curves are plotted as a series of separated spots or dots.

In a cathode ray tube the emitted light intensity is proportional to the energy of the electron beam which impinges on the phosphor coating. In practice the potentials of the control elements are adjusted to such a value that the beam does not unduly heat or burn or otherwise injure the phosphor coating at any spot where the beam may remain at rest for any appreciable period. Where increased light intensity is desired, however, an increase in the beam current is required. This produces greater heating of the phosphor coating in the area of beam impingement, particularly when the beam is repetitively applied to a single position or is slowly moving, with a resultant shortening of the useful life of the tube. Repetitive scanning along the same path by the cathode ray tube beam tends, also, to result in eventual burning of the phosphor coating. This, in turn, causes a reduction in the effective light intensity. Thus, a problem inherent in prior art cathode ray tube display devices is the relatively short life of the phosphor coating particularly in applications where the information being displayed is slowly changing or is constantly slowly retracing the same path.

It has been proposed in the prior art to prolong the useful life of the phosphor coating in cathode ray tube display apparatus by spreading out the area of the beam impingement. This is effected by focusing and defocusing the beam on the phosphor coating at a predetermind modulation frequency. Such an arrangement is shown in U.S. Pat. No. 3,441,668, S. E. Townsend. It has also been proposed in the prior art to shift the path of the beam transversely to the direction of repetitive sweep, at a suitable rate, as shown in U.S. Pat. No. 3,700,955, Peter R. Lowe.

A disadvantage of the prior art apparatus first mentioned above, however, is a loss in sharpness of the trace produced. Additionally, when the information being displayed is not changing or only changing slowly, the continual or repetitive impingement of the beam on the same spot tends to cause phosphor fatigue or a burn in the phosphor coating, notwithstanding the provisions made for modulating the beam focusing to avoid such result. A disadvantage of the second mentioned prior art apparatus is the distortion produced in the curve as a result of the transverse shifting of the beam.

Two general types of cathode ray tube display apparatus are known in the art. One is a so-called raster scan or repetitive line scan display. The other is an X-Y or vector display. The prior art solutions for prolonging the life of the cathode ray tube phosphor coating have been in connection with raster scan or line scan dislay apparatus and are not practically suitable for X-Y or vector scan display apparatus aside from the inherent disadvantage of those solutions.

SUMMARY OF THE INVENTION

Among the objects of the present invention is the prolongation of the useful life of the cathode ray tube in graphic display apparatus.

A particular object of the invention is to provide an improvement to graphic display apparatus of the cathode ray tube X-Y or vector type such, that, when the information being displayed is unchanging or slowly changing in both coordinates the electron beam is prevented from causing fatigue or a burn in the phosphor coating of the tube.

In accomplishing these and other objects, the apparatus of the present invention departs from the techniques employed in the prior art by inhibiting the production of those points or line segments on the face or screen of the CRT that are essentially repetitive and convey no useful information to the observer, and which if allowed to persist, would cause fatigue or a burn in the phosphor coating.

A feature of the present invention is the protection of the CRT phosphor coating from excessive concentrations of electron beam current during the plotting of X-Y loops, which concentrations, for example, tend to be caused by the plotting against each other of two signals each of which have substantially static overlapping regions. The phase realtionship of such signals is often of interest, particularly to physicians in medical applications, where the signals represent specific physiological parameters of a patient. The interest generally, however, is in the relationship between the two signals during their changing or active regions. In their static or inactive regions, the resultant X-Y loop that would be plotted comprises only a single spot or point on the face of the CRT. This point conveys no useful information to the physician and tends to cause fatigue or burn in the phosphor coating if it is allowed to persist. The apparatus of the present invention is characterized in its effectiveness in detecting the imminence of such spots and deemphasizing them on the face of the CRT.

BRIEF DESCRIPTION OF THE DRAWINGS

A better understanding of the present invention may be had from the following detailed description when read in connection with the accompanying drawings wherein: responsive deflecting gating means

DESCRIPTION OF THE PREFERRED EMBODIMENT

THE CURVES OF FIG. 1

Figure 1:
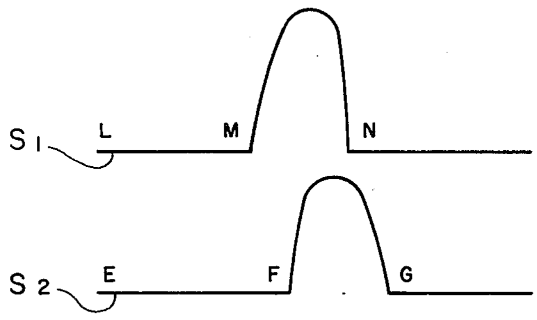
FIG. 1 is a representation of two typical signals that might be plotted by the apparatus of the present invention.

FIG. 1 shows curves representing two typical signals A and B which advantageously may be plotted by display apparatus of the X-Y or vector CRT type. Generally, the user of the apparatus is interested in the relationship between the two analog signals during their active regions, shown in FIG. 1 as being between points M and N (M → N) for signal $S_1$ and from points F to G (F → G) for signal $S_2$. The phase relationship of such signals often is of interest when making medical studies and analyses where, for example, the signals represent specific physiological parameters of a patient. In the regions L → M and E → F, however, the signals are shown as being substantially inactive. The resultant X-Y loop obtained with apparatus of the prior art when the signals are plotted and when they are in their inactive regions is a single spot or point on the face of the CRT. This point conveys no useful information to the physician or other observer and causes a burn in the phosphor coating of the CRT if it is allowed to continue too long.

According to the present invention the imminence of such spots or points is detected and such spots are de-emphasized on the CRT. The invention has particular and specific utility in connection with X-Y or vector CRT display apparatus.

THE APPARATUS OF FIG. 2

Figure 2:
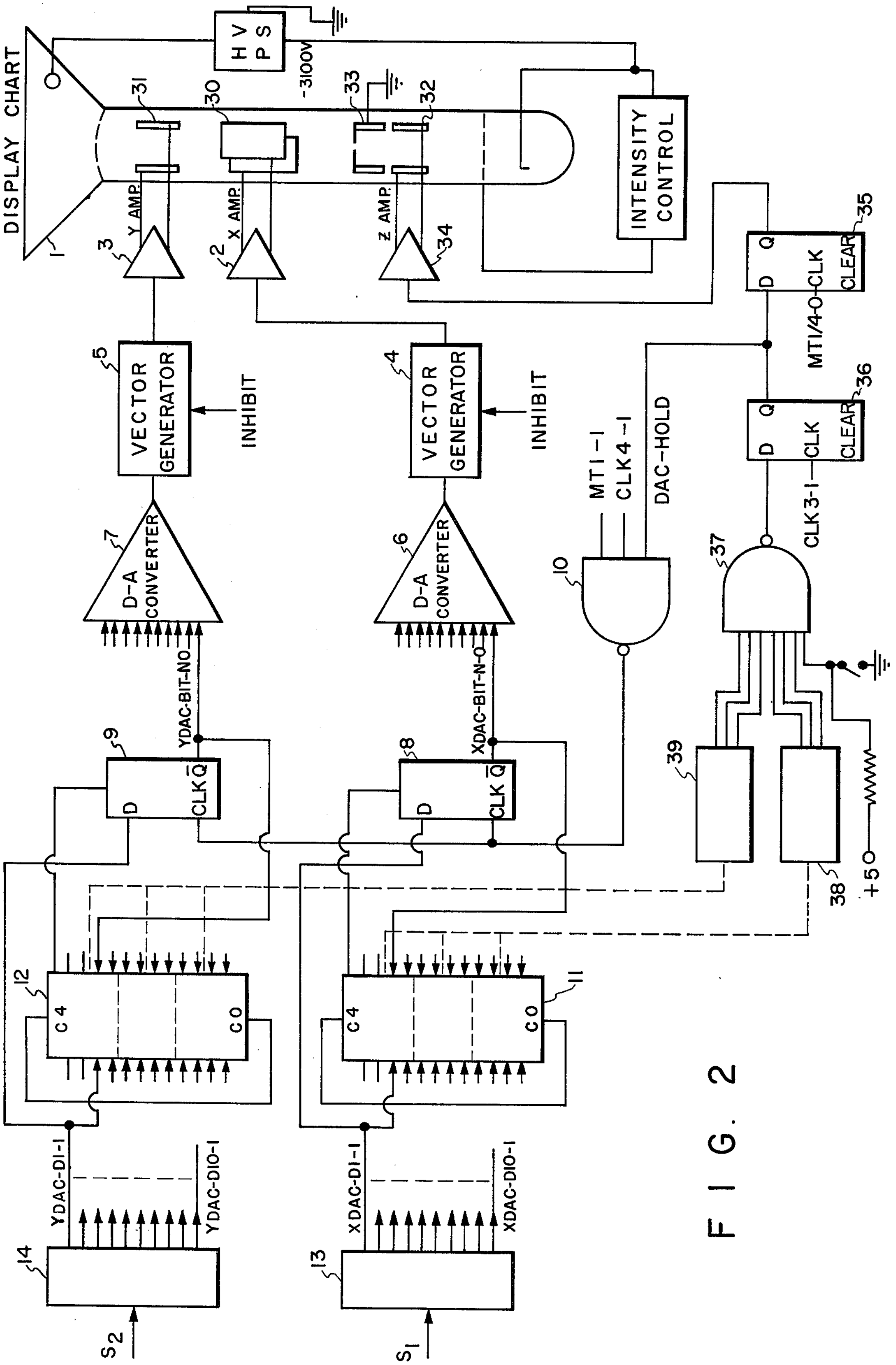
FIG. 2 is a schematic diagram of the graphic display apparatus of the X-Y or vector type according to the present invention.

In the apparatus illustrated in FIG. 2, a CRT 1 is driven in the X axis by an amplifier 2 and in the Y axis by an amplifier 3. The input circuits of amplifiers 2 and 3, in turn, are driven by respectively associated vector generators 4 and 5. The vector generators 4 and 5, in turn, are driven by respectively associated 10 bit Digital to Analog (D-A) converters 6 and 7. The D-A converters 6 and 7 are each driven by individually associated latches 8 and 9, respectively. The $\overline{Q}$ output of latch 8 is connected to an associated input of D-A converter 6 and also to the $B_1$ input of an associated three-stage adder 11. Similarly, the $\overline{Q}$ output of latch 9 is connected to an associated input of D-A converter 7 and also to the $B_1$ input of an associated three-stage adder 12. The CK inputs of latches 8 and 9 are each connected to the output of a NAND gate 10. The NAND gate 10 has three inputs respectively designated MT1-1, CLK4-1 and DAC HOLD. Typical clock signals that are applied to these inputs are illustrated in the timing diagram of FIG. 4. The D input of the latch 8 is connected to an associated $A_1$ input of the adder 11, and also to an associated output of Analog to Digital (A-D) converter 13. Similarly, the D input of latch 9 is connected to an associated $A_1$ input of adder 12, and also to an associated output of A-D converter 14. With respect to the latter connections the D input of latch 8 is connected to the input designated X DAC DN-1 of A-D converter 13, and the D input of latch 9 is connected to the input designated Y DAC DN-1 of A-D converter 14.

By this arrangement latch 8 and adder 11 receives information in 10 bit digital form from the output of the A-D converter 13. This information is representative of a first signal, for example, analog signal $S_1$ of FIG. 1, sampled values, $S'_1$, of which signal are applied to the input of A-D converter 13. Similarly, latch 9 and adder 12 receives information in 10 bit digital form representative of a second signal, for example, analog signal $S_2$. This information is applied to circuit 9 from the output of the A-D converter 14, to the input of which sampled values, $S'_2$, of analog signal $S_2$ are applied. The arrangement desirably is such that the A-D converters 13 and 14 synchronously output a new digital representation to their respectively associated devices 8, 11 and 9, 12 every 2.7 microseconds (usec). similarly, the D-A converters 6 and 7 synchronously output a new analog value every 2.7 usec to their respectively associated vector generators 4 and 5. The means for deriving successively sampled values $S'_1$ and $S'_2$ of analog signals $S_1$ and $S_2$, respectively, at the inputs of A-D converters 13 and 14 may be of known type are are not illustrated to avoid unduly complicating the disclosure of the invention.

THE VECTOR GENERATORS 4 and 5

Each of the vector generators 4 and 5 is so designed that an analog voltage step input to the generator will cause an output voltage which proceeds between the step levels in a linear, staircase, fashion in just 2.7 usec.

Figure 3:
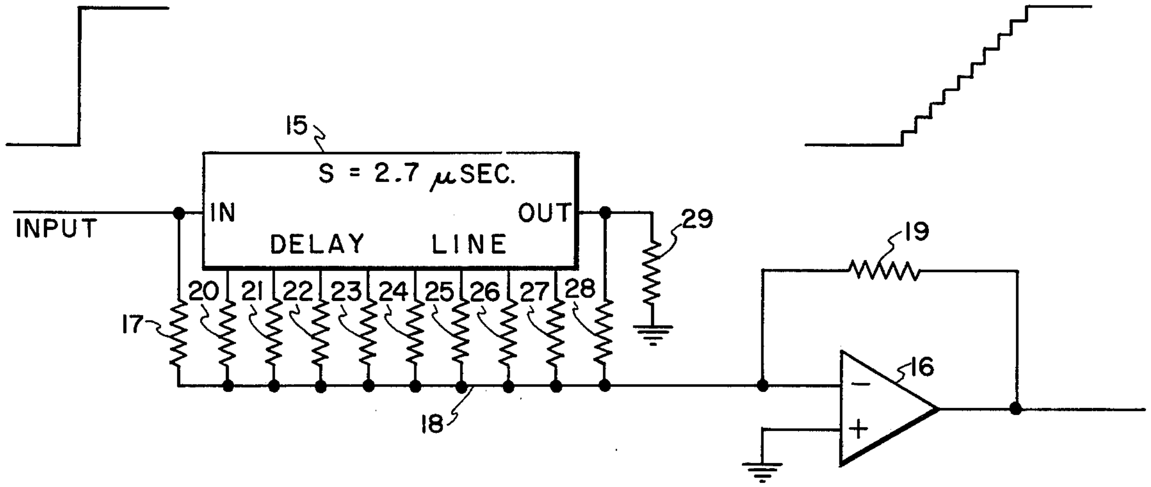
FIG. 3 is a diagram illustrating the circuit of the vector generators of the FIG. 2 apparatus.

As seen in FIG. 3, each of the generators 4 and 5 includes a resistance, capacitance, inductance (RCL) delay line, indicated at 15, and an operational amplifier, indicated at 16. The delay line 15 has an input terminal adapted for connection to the output of the D-A converter that is associated with the generator. The said input terminal is connected by a resistor 17 to a summing line 18 that is connected to the inverting input terminal of operational amplifier 16. The latter input terminal also is connected by a resistance 19 to the output terminal of the operational amplifier 16. The non-inverting terminal of the amplifier 16 is connected to ground potential. Also connected to the summing line 18 is one end of a plurality of resistors, indicated at 20 through 28, the other ends of which are connected to respectively associated taps of the delay line 15. A terminating resistor 29 is connected between the output terminal of the delay line 15 and ground.

As illustrated in FIG. 2, the CRT 1 includes X deflection plates indicated at 30 and Y deflection plates indicated at 31. The vector generator 4 and amplifier 2 drive the X deflection plates 30. Similarly, the vector generator 5 and amplifier 3 drive the Y deflection plates 31. The CRT in an operative embodiment of the invention is provided with a 12 inch diagonal display face although other size CRT display areas may be provided, if desired, as is known in the art. The D-A converters 6 and 7 are each provided with new digital values from their individually associated A-D converter 13 and 14, respectively, at the periodic rate of about 2.7 usec. These data values are displayed on the face of the CRT 1 with the vector generators 4 and 5 making the electron beam of the CRT proceed in a substantially smooth fashion between points.

The CRT 1 further includes a pair of beam gating plates indicated at 32 and an anode 33. Anode 33 is connected to ground potential and plates 32 are connected to the output of Z-amplifier 34. When at the same potential the beam gating plates 32 cause no deflection of the CRT electron beam as the latter passes through the anode aperture. If there is a voltage bias between the two plates 32, however, the beam is deflected and caused to miss the aperture of anode 33. The beam is thus prevented from reaching the screen of the CRT, and hence, is blanked. There is no proportional control of intensity of the display. The beam is either on the screen (unblanked) or off the screen (blanked). The cathode of the CRT is always emitting full current.

The input of the Z-amplifier 34 is connected to the Q output of a latch indicated at 35. The latter, in turn, is connected to the Q output of a latch 36 and also to the terminal indicated DAC HOLD of NAND gate 10. The D input of latch 36 is connected to the output of a NAND gate 37. The CK inputs of latches 35 and 36 are connected to MT1/4-0 and CLK3-1, respectively. The several inputs of gate 37 are connected to the outputs of a pair of gate circuits generally shown at 38 and 39. Gate circuits 38 and 39 are connected to and are arranged in cooperative relation with the adder circuits 11 and 12, respectively, as is shown in and more fully described in connection with FIG. 5.

The latch and adder circuits 8, 11 and 9 and 12 are arranged to provide an evaluation of the vector length of each data value. Specifically, and as will be described in further detail hereinafter, if a vector is shorter than 4 bits in both the X and Y direction, the circuits 8, 11 and 9, 12 cooperate with gate circuits 37, 38 and 39 and latches 35 and 36 to send a signal to the Z-amplifier 34 to blank the electron beam, and thereby prevent a display of the vector on the CRT 1.

Figure 5:
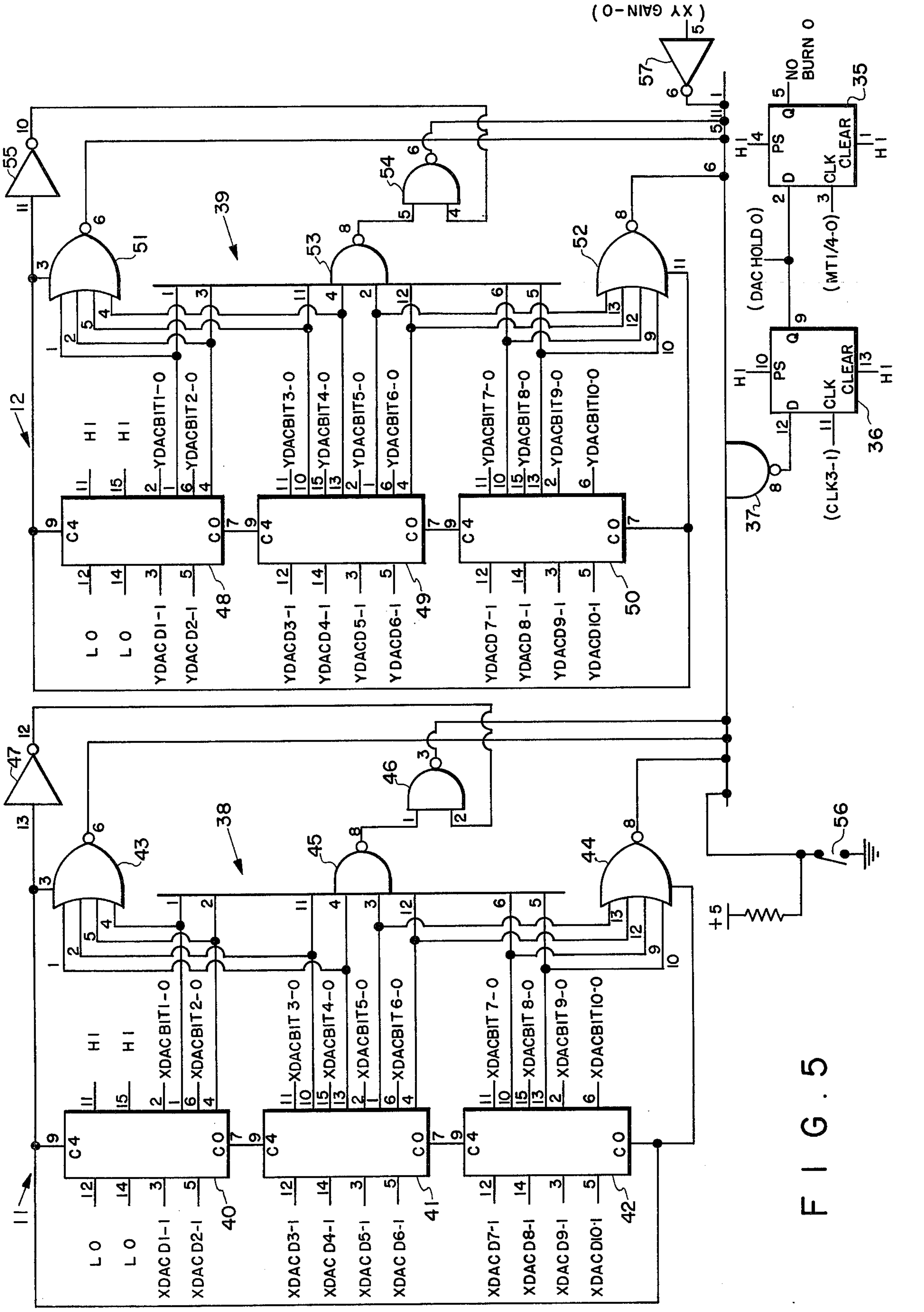
FIG. 5 is a diagram illustrating in detail the adder and gate circuits of the FIG. 2 apparatus.

FIG. 5 illustrates in greater detail the adder circuits 11 and 12 and the gate circuits 37, 38 and 39. The circuit 11, as shown, includes three 4-bit binary full adders indicated at 40, 41 and 42. Desirably these adders are of the fast carry type. Gate circuit 38 includes two NOR gates shown at 43 and 44, two NAND gates indicated at 45 and 46, and an inverter shown at 47.

Similarly, the circuit 12 include three 4-bit binary full adders indicated at 48, 49 and 50. Gate circuit 39 includes two NOR gates indicated at 51 and 52, two NAND gates indicated at 53 and 54, and an inverter shown at 55.

Each digital input bit from the outputs of A-D converters 13 and 14 to the inputs of the respectively associated D-A converters 6 and 7, as seen in FIGS. 2 and 5, is driven by a separate latch. The latch 8, for example, comprises a D-Type positive edge triggered flip flop associated with the signal to be displayed on the X-axis. The latch 9 is similar to the latch 8 and includes a flip flop associated with the signal to be displayed on the Y-axis. Thus, as seen in FIG. 2, the X input bit for an X data bit, is applied to the D terminal of latch 8, and a Y input bit for a Y data bit 1 is applied to the D input terminal of latch 9. The CK input terminal of each the latches is connected to the output terminal of NAND gate 10. The additional latches that are employed for the nine other digital input bits for each of the signals to 2.7 displayed on the X and Y axes have not been described, nor shown, to avoid unnecessary complication of the description and the drawing.

OPERATION OF THE PREFERRED EMBODIMENT

Figure 4:
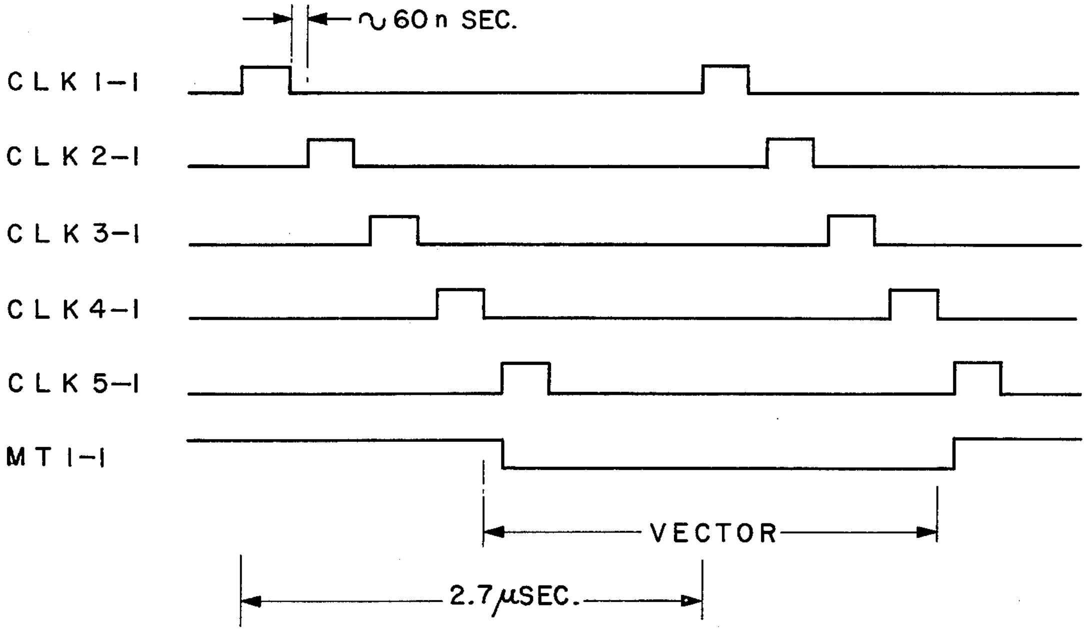
FIG. 4 is a diagram showing the clock timing of the apparatus of FIGS. 2 and 3.

By reference to FIG. 2 and 4, it is noted that the signal $\overline{\text{MT1-1. CLKF4-1}}$ occurs every 2.7 usec. This signal is the trigger for the start of a new display vector. This signal clocks logic signals from the inputs D of the latches 8 and 9 to the $\overline{Q}$ outputs of the said latches as well as inverting them. The display vectors, therefore, proceed between concurent positive edges of this signal. For slowly changing data there is a very small difference between the data on the inputs D of the latches 8 and 9 just before the latches are clocked and the previous data which then presently is inerted on the outputs $\overline{Q}$. Consequently, an evaluation of the vector length can be made by comparing the data on each latch input and output just before transfer, for example, at MT1-1. CLK3-1, as seen in FIG. 4. New input data is clocked to the input, finishing at MT1-1. CLK1-1.

The circuit of FIG. 5 has the following function. If the vector succeeding that mentioned in the preceding paragraph is found, when evaluated, to be less than 4 bits long in both the X and Y directions, then it is blanked. Also, the MT1-1. CLK4-1 signal is inhibited from clocking the latches 8 and 9. A consequence of this is that the old data stays on the latch $\overline{Q}$ output. Only when the new data is found to be different from the old data by 4 bits or more is the next vector unblanked and the latches 8 and 9 clocked.

Figure 6:
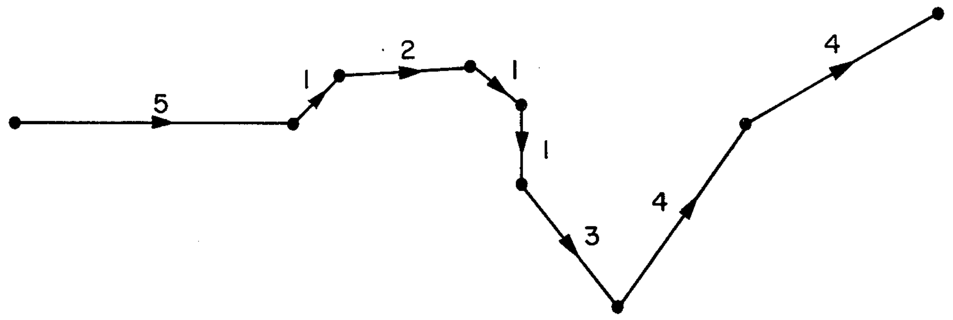
FIG. 6 illustrates a typical CRT electron beam path of prior art X-Y or vector display apparatus.
Figure 7:
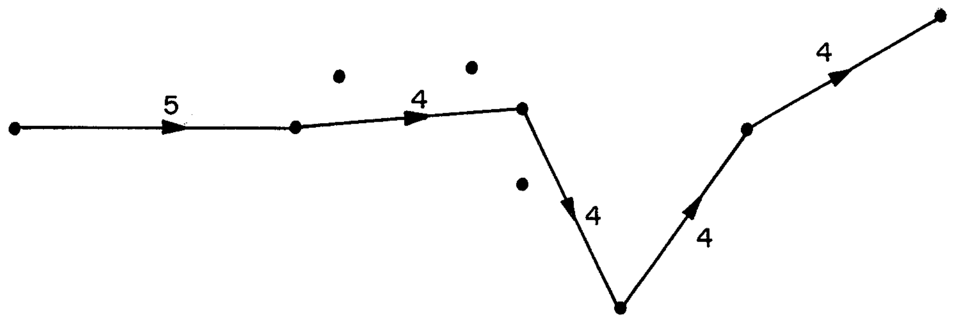
FIG. 7 illustrates a typical CRT electron beam path obtained with the X-Y or vector display apparatus according to the present invention.

The operation of the apparatus of FIG. 5 is further described by reference to FIGS. 6 and 7. FIG. 6 shows a typical path that the electron beam would trace on the screen of CRT 1 if the circuit of FIG. 5 were not provided. The numbers associated with the vectors in FIG. 6 represent the maximum data change, in bit terminology, of X or Y. FIG. 7 shows the same data but with vectors inhibited to maintain a certain minimum trace velocity of the electron beam on the face or screen of the CRT 1. Thus, by reference to FIG. 7, it will be seen that when new data is found to be different from the old data by less than 4 bits the data is inhibited and is not displayed on the face of the CRT.

It is noted, that in practical terms 4 bits out of the 1024 that are available with a 10 inch vertical CRT screen computes to 0.039 inches or 0.099 centimeters. This is about 1½ trace widths. Hence, very little useful data is inhibited. Significant protection against burning and/or fatigue is achieved, however, for the phosphor of the CRT.

The circuit of FIG. 5 provides a practical way of implementing the data display inhibiting action for both the X and Y axes. The X axis circuit, 11 and 38, and the Y axis circuit, 12 and 39 each essentially comprise a 12 bit adder. One set of inputs, A, in each case is the data at the respective D inputs to the latches 8 and 9. The other set of inputs, B, in each case comprise the outputs $\overline{Q}$ of the respective latches, which outputs are inverted. The overflow from each of the terminals C4 of adders 40, 48 of FIG. 5 is fed back into the CO input of the respectively associated adder 42, 50, and in each case comprises the end around carry.

By way of illustration and not limitation, the following computation is provided to show the output for the adders of circuits 11 and 12 for some different data changes using an arbitrary initial digital data value of

| | | | |
|---|---|---|---|
| 1 | 101 | 101 | 101 |

-continued

| | | | | | |
|---|---|---|---|---|---|
| Example 1 IN = OUT wired in | | 10 | 987 | 654 | 321 |
| | A | 001 | 101 | 101 | 101 |
| | B | 110 | 010 | 010 | 010 |
| | Σ 0 | 111 | 111 | 111 | 111 |
| carry out | | | | | |
| Example 2 A = B + 1 | | | | | |
| | A | 001 | 101 | 101 | 110 |
| | B | 110 | 010 | 010 | 010 |
| | Σ 1 | 000 | 000 | 000 | 001 |
| Example 3 A = B + 3 | | | | | |
| | A | 001 | 101 | 110 | 000 |
| | B | 110 | 010 | 010 | 010 |
| | Σ 1 | 000 | 000 | 000 | 011 |
| Example 4 A = B + 4 | | | | | |
| | A | 001 | 101 | 010 | 001 |
| | B | 110 | 010 | 010 | 010 |
| | Σ 1 | 000 | 000 | 000 | 100 |
| Example 5 A = B − 1 | | | | | |
| | A | 001 | 101 | 101 | 100 |
| | B | 110 | 010 | 010 | 010 |
| | Σ 0 | 111 | 111 | 111 | 110 |
| Example 6 A = B − 3 | | | | | |
| | A | 001 | 101 | 101 | 010 |
| | B | 110 | 010 | 010 | 010 |
| | Σ 0 | 111 | 111 | 111 | 100 |
| Example 7 A = B − 4 | | | | | |
| | A | 001 | 101 | 101 | 001 |
| | B | 110 | 010 | 010 | 010 |
| | Σ 0 | 111 | 111 | 111 | 011 |

By reference to the above-mentioned examples, and with further examination (this is the basis for one's complement types of subtraction), the following may be established:

1. If there is a "1" in the overflow, then A is greater than B;
2. If there is a "O"in the oerflow, then A is equal to or less than B;
3. If there is a "1" in the overflow and any "1" in bit 3 through 10, then A is equal to or greater than B + 4;
4. If there is a "0" in the overflow and any "0" in bit 3 through 10, then A is equal to or less than B - 4.

The criteria for a wanted vector accordingly is statement 3 or 4.

The operation of the circuit of FIG. 5 for the X axis will be described. The two gates 43 and 44 of circuit 38 are used to test for the condition of statement "3" above. Thus, the gates 43 and 44 are enabled by the overflow of the adders 40, 41 and 42. The NAND gate 45 of circuit 11 looks for any " on the 3 through 10 outputs of the adders 40, 41 and 42 and has a hih output if a "0" is sensed. The output of NAND gate 46 then goes low if its terminal 2 is made high by an inverted overflow from output terminal 12 of inverter 47.

The operation of the circuit for the Y axis is similar to that of the X axis. Thus, the gates 51 and 52 are used to test for the condition of statement "3" above. The gates 51 and 52 are enabled by the overflow of adders 48, 49 and 50. The NAND gate 53 looks for any "0" on the 3 through 10 outputs of the adders 48, 49 and 50 and has a high output if a "0" is sensed. The output of NAND gate54 goes low if its input terminal 4 is made high by the inverted overflow from terminal 10 of inverter 55.

If any of the eight inputs to NAND gate 37 are low, the output thereof will be high and the next vector to be displayed will be unaffected. If, however, all of the inputs to NAND gate 37 are high, the output thereof goes low. This means that none of the conditions stated above that show the next vector to be 4 bits or longer have been met.

When the output of NAND gate 37 goes low, a "0" is clocked by pulse CLK3-1 to the Q output of latch 36. This signal, identified as DAC HOLD-O, now is low. This signal is applied to the input of the NAND gate 10, as seen in FIG. 2, resulting in a high signal on output of NAND gate 10. This signal inhibits the $\overline{Q}$ output of latches 8 and 9 at the time of the occurrence of pulse CLK4-1.

At the time when the latches 8 and 9 would normally be clocked, ($\overline{\textbf{MT1-1.CLK4-1}}$), the low on the Q output of latch 36 is clocked into the Q output of latch 35, as seen in FIG. 5. The Q output of latch 35 is connected to the input of the Z amplifier 17, as seen in FIG. 2. The Z amplifier then applies a potential to beam gating plates 32 to switch the beam off the screen of the CRT 1, that is, to blank the beam.

When the incoming data has changed by 4 bits or more, the output of NAND gate 37 goes high and a "1" is clocked by pulse CLK3-1 to the Q output of latch 36. This signal is applied to the input of NAND gate 10, resulting in a low signal on the output of the latter. This releases the latches 8 and 9 and the new data on the inputs D of the said latches is transferred to the D-A converters 6 and 7. Synchronously with this action, the beam of the CRT is switched on, by the Z amplifier 34, that is, unblanked, as a result of Q output the latch 35 going high.

If desired, NAND gate 37 may have one input which has a manually set wire link as shown at 56 to force a 1 or 0 on to the said input. With a 0 on the said input, the circuit is disabled and there is no protection against burn or fatique of the phosphor coating of the CRT 1.

The circuit may also be disabled when the output of an inverter indicated at 57 is low. This result may be desired where there may be time slots for information not having X-Y loops on them, for which time slots, therefore, protection against phosphor burn is not required, nor desired.

By way of illustration and example and not by way of limitation, it is noted that the several components or devices shown in symbolic form in FIGS. 2 and 5 may, if desired, be of the commercially available types listed below:

| | |
|---|---|
| CRT 1 | Type 10M43P31, Thomas Electronics Inc. |
| Amplifier 16 | Type 3550, Burr Brown Research Corporation |
| D-A Converters 6 and 7 | Type DAC10, Burr Brown Research Corporation |
| Latches 8, 9, 35, 36 | Type SN 7474, Texas Instruments |
| Adders 11 and 12 | Type SN 74283, Texas Instruments |
| Gates 43, 44, 51 and 52 | Type SN 7425, Texas Instruments |
| Gates 45, and 53 | Type SN 7430, Texas Instruments |
| Gates 46 and 54 | Type SN 7400, Texas Instruments |
| Gate 37 | Type SN 7430, Texas Instruments |

Thus there has been provided in accordance with the present invention an improved structure for inhibiting in X-Y or vector type cathode ray tube display apparatus, the production of those points or line segments on the face of the CRT screen that are essentially repetitive and convey no useful information to the observer, and which, if allowed to persist too long, cause a burn in the phosphor coating.

The embodiments of the invention in which an exclusive property or privilege is claimed are defined as follows:

1. Apparatus selectively responsive to successive digital representations of changing data values including means to compare the digital representation of a data value with the digital representation of a preceding data value to produce a digital output signal representative of the incremental difference between said data values, and means responsive to said incremental difference signal to inhibit the response of said apparatus to those data values when said incremental difference is less than a predetermined value and to restore said response of said apparatus to said data values when the cumulative value of said incremental difference is equal to or greater than said predetermined value.

2. Apparatus as specified in claim 1 wherein said means to compare includes an adder.

3. Apparatus as specified in claim 1 wherein said means to inhibit the response of said apparatus includes latch means associated with each bit of the digital representations of said data value and said preceding data value, said latch means having two stable states, one an inhibit state and the other an allow state, and means operative when the difference between said data values is greater than a predetermined value to actuate said latch means to said allow state.

4. Apparatus as specified in claim 1 including a cathode ray tube having a screen, electron beam producing means, beam deflecting means, and beam blanking means, means responsive to said data values to control said beam deflecting means, and means responsive to said digital output signal to control said beam blanking means.

5. Apparatus as specified in claim 4 wherein said means responsive to said data values to control said beam deflecting means includes a vector generator that is operative in response to an analog value step input to cause an output changing value which proceeds between the step levels in a substantially linear fashion in a predetermined time, a digital to analog converter operatively connected to convert the digital representations of said changing data value to a corresponding analog value, and a connection to apply the output analog value of said digital to analog converter to the input of said vector generator whereby the electron beam of said cathode ray tube proceeds smoothly along said screen in accordance with the changes in said changing data value.

6. Apparatus as specified in claim 4 wherein said beam deflecting means includes a first deflecting means to deflect the electron beam of said cathode ray tube in a first direction and a second deflecting means to deflect the said electron beam in a second direction displaced substantially at a right angle from said first direction, wherein said means responsive to said data values to control said beam deflecting means include first and second digital to analog converters each having a plurality of digital input terminals and analog output terminals, each of said digital to analog converters being operative to convert digital representations of a data value applied to said input terminals to a corresponding analog value at said output terminals, first and second vector generators each having an input and output, each of said vector generators being operative in response to an analog value step input applied to its input to cause an analog value at its output which proceeds between the step levels in a substantially linear fashion in a predetermined time, a connection to apply the output of said first digital to analog converter to the input of said first vector generator, a connection to apply the output of said second digital to analog converter to the input of said second vector generator, means to apply the output of said first vector generator to said first beam deflecting means, and means to apply the output of said second vector generator to said second beam deflecting means, whereby the electron beam proceeds smoothly along the screen of said cathode ray tube in said first and second directions between positions indicative of the changing values of said data values.

7. Apparatus selectively responsive to successive digital representations of changing data values including means to compare the digital representation of a data value with the digital representation of a preceding data, value to produce a digital output signal representative of the difference between said data values, and means to inhibit the response of said apparatus to those data values that differ from a preceding value by less than a predetermined value of said digital output signal, said digital representations of said data value and said preceding data value being each in 10 bit digital form, said means to compare the digital representation of said data value with the digital representation of a preceding data value including an adder to which digital representations are applied, and means connected to said adder and operative in response either to a digital 1 in the adder overflow and a digital 1 in bits three through ten, or to a digital 0 in the adder overflow and a digital 0 in bits three through ten, to produce said digital output signal, said signal being indicative of a predetermined difference between said data value and said preceding data value.

8. Apparatus as specified in claim 7 wherein said means to inhibit the response of said apparatus includes latch means associated with each of the bits of the digital representations of said data value and said preceding data value, said latch means having two stable states, one an inhibit state and the other an allow state, means to actuate said latch means between said inhibit state and said allow state, and means responsive to said digital output signal to control said last mentioned means.

9. In combination, means to compare the digital representations of a data value and a preceding data value to produce a digital output signal representative of a difference between said data values, said means to compare comprising a ten bit digital adder having bit terminals and an overflow terminal, and gating means connected to said bit terminals and to said overflow terminal to test for either a digital 1 on said overflow terminal and for a digital 1 in bits three through ten of said bit terminals or for a digital 0 on said overflow terminal and for a digital 0 in bits three through ten, said gating means being operative in either event to produce said digital output signal representative of a predetermined difference between said data values.

10. Apparatus responsive to the digital representations of analog data values and operative to inhibit response to those data values that differ from an immediately preceding data value by less than a predetermined value, said apparatus including a separate latch associated with each bit of a data value digital representation, each of said latches having an input, an inverting output, and a clocking terminal, an adder having first and second sets of input terminals, overflow terminals, and a plurality of output terminals, each digital representation of a data value being applied to the input terminals of said latches and to said first set of input terminals of said adder, circuit connections from the inverting terminals of said latches and corresponding input terminals of said second set of adder input terminals, gating means connected to said adder output terminals and arranged to respond to a predetermined digital characteristic on said output terminals to provide a control signal, means operative selectively to withhold or apply a clocklng signal to the clocking terminals of each of said latches thereby to inhibit or allow response of said latches to the data value digital representation then applied to the input terminals thereof, and a circuit connection to apply said control signal to control said last mentioned means and thereby response of said apparatus to the said last mentioned data value digital representation.

11. A combination as specified in claim 10 including a cathode ray tube having a screen, electron beam producing means, beam deflecting means, and beam blanking means, means resonsive to the digital representations of said data values to control said beam deflectiing means, and means responsive to said control signal provided by said gatingmeans to control said beam blanking means.

* * * * *